US008724332B2

(12) United States Patent
Manes et al.

(10) Patent No.: US 8,724,332 B2
(45) Date of Patent: May 13, 2014

(54) EXPANSION GUIDE ALIGNMENT FOR A STORAGE LIBRARY

(75) Inventors: Joseph Paul Manes, Arvada, CO (US); Donald Robert Manes, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 263 days.

(21) Appl. No.: 13/408,883

(22) Filed: Feb. 29, 2012

(65) Prior Publication Data

US 2013/0223000 A1 Aug. 29, 2013

(51) Int. Cl.
*H05K 7/00* (2006.01)

(52) U.S. Cl.
USPC .......................................... 361/729; 361/756

(58) Field of Classification Search
CPC ......... H05K 5/0204; H05K 7/00; H05K 7/02; H05K 7/18; H05K 7/20; H05K 7/1425; H05K 7/20536; H05K 7/20581; H05K 7/14; H05K 5/00; H05K 9/0001
USPC ............ 361/600, 679.01, 727–730, 748, 756, 361/759, 784, 785, 796; 439/55, 76.1, 439/924.1
See application file for complete search history.

(56) References Cited

U.S. PATENT DOCUMENTS

| 4,748,539 | A  | * | 5/1988 | Fukuyama ................... | 361/757 |
| 6,621,712 | B2 | * | 9/2003 | Siira et al. ..................... | 361/796 |
| 7,375,960 | B2 | * | 5/2008 | Blaalid et al. ............ | 361/679.33 |
| 8,011,951 | B2 | * | 9/2011 | Moore et al. .................. | 439/532 |
| 8,360,802 | B2 | * | 1/2013 | Allard et al. .................. | 439/501 |

* cited by examiner

*Primary Examiner* — Hung S Bui

(74) *Attorney, Agent, or Firm* — Marsh Fischmann & Breyfogle LLP; Daniel J. Sherwinter

(57) ABSTRACT

Systems and methods are described for maintaining secure and contiguous guide transitions in the context of modular installations. Embodiments of the guides are configured to automatically register and couple with each other during installation of their respective modules to provide relatively high tolerance guide transitions, even in the context of relatively lower tolerance modular installations. In some embodiments, a guide is configured to be biased in a first position when its respective module is not installed. When its module is located in a partial-install location relative to an adjacent module with the guide in the first position, guide features mechanically register with features of the adjacent module's guide. When moved into a full-install position, the guide moves into a second position causing the guide to finally register and couple with the adjacent guide, thereby manifesting a stable and contiguous transition between the guides.

20 Claims, 13 Drawing Sheets

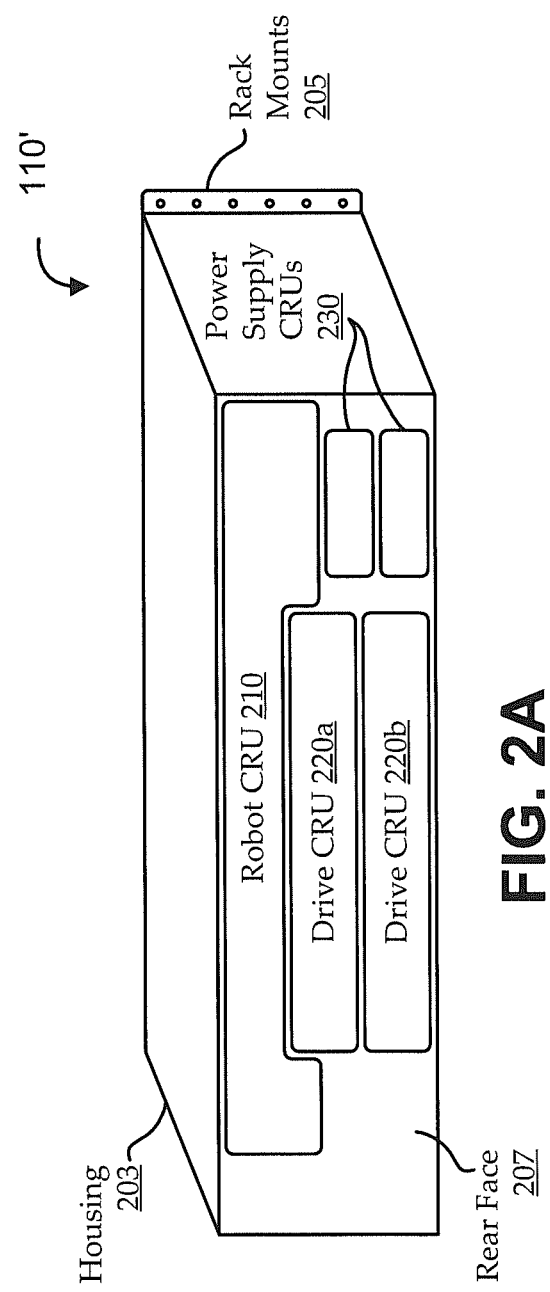
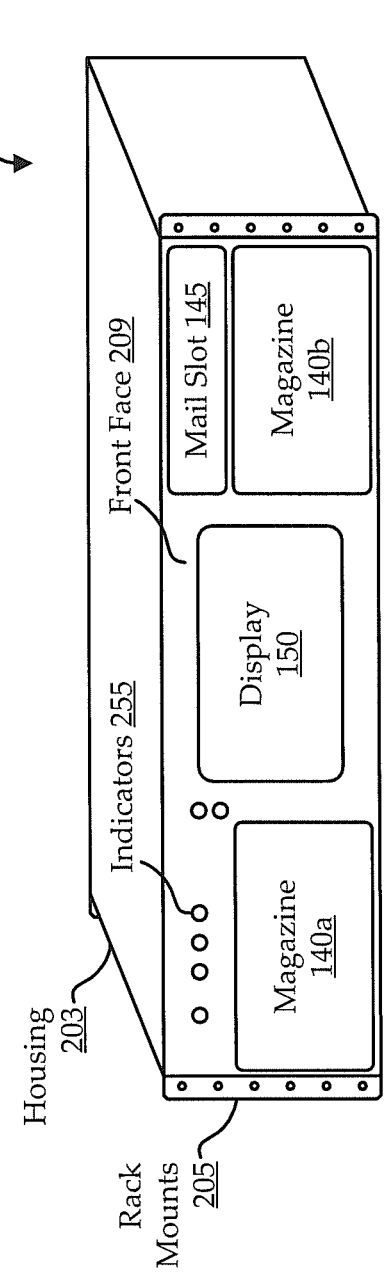
FIG. 2A
FIG. 2B

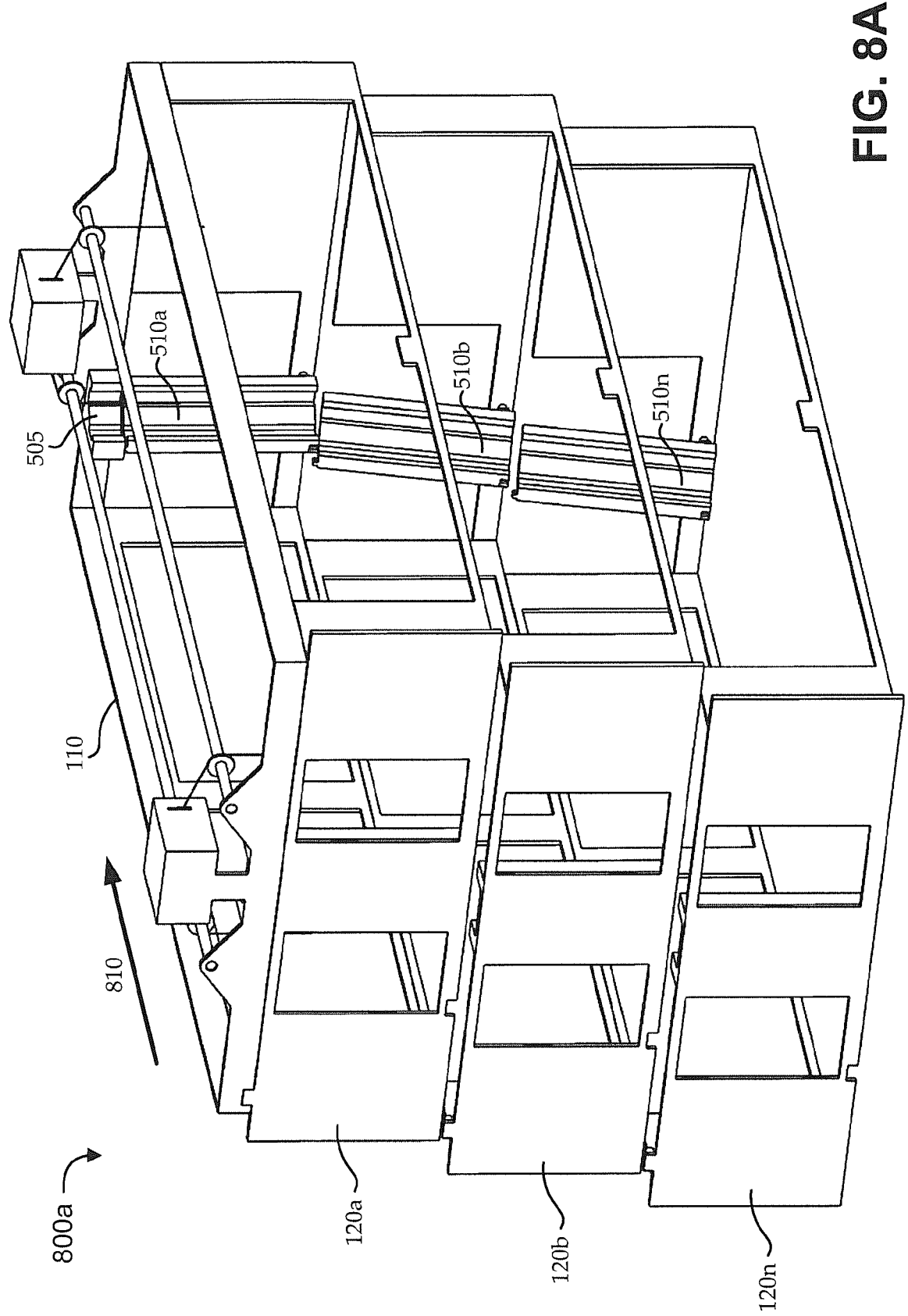

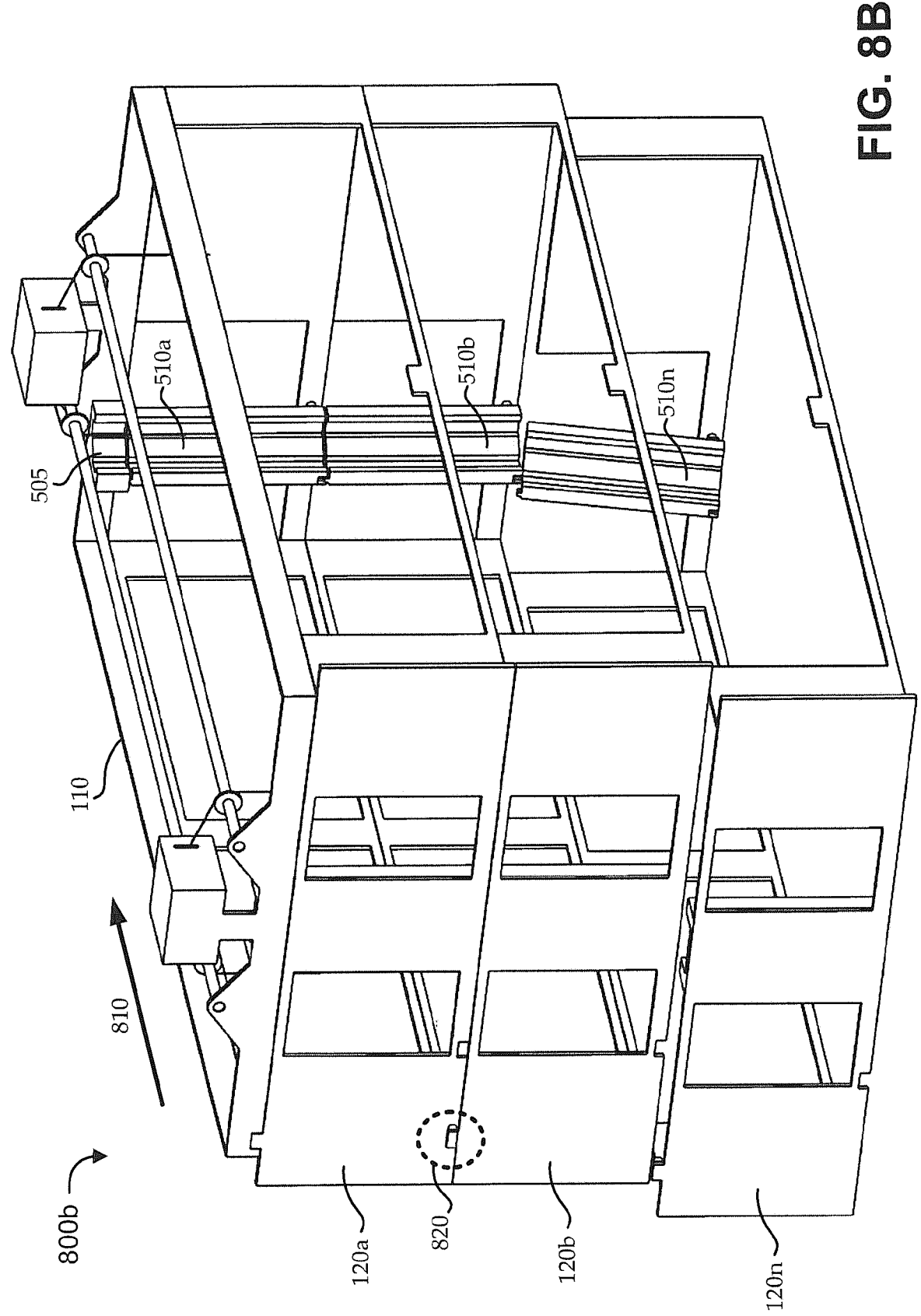

EXPANSION GUIDE ALIGNMENT FOR A STORAGE LIBRARY

FIELD

Embodiments relate generally to data storage systems, and, more particularly, to alignment of guide systems in context of modular storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (10) operations on multiple cartridges.

To facilitate movement of the robotic mechanism throughout the storage library system, some implementations include one or more carriages (e.g., platforms) that move in one or more axes along one or more guides. For example, the robotic mechanism can be connected to a platform that moves in a Z direction (e.g., up and down with respect to the storage library system) along one or more guide rails. In a non-modular implementation of the storage library system, it is straightforward to minimize any potential discontinuities and/or other undesirable features of a guide. For example, a one-piece guide rail can be installed, multiple pieces can be installed with high levels of tolerance, etc. This can allow the one or more carriages to move along the one or more guides substantially without interference from imperfections in the guides.

In modular implementations of the storage library system, one or more expansion modules can be added to a base module to expand the capacity of the storage library system. Allowing the robotic mechanism to operate within those expansion modules may involve extending the one or more guides into those modules. However, it can be difficult to minimize undesirable guide transitions between modules while allowing expansion modules to be easily installed and uninstalled. For example, designing expansion modules for easy installation may involve designing the expansion modules to have a certain amount of float in one or more directions during installation. This float, however, may not be tolerable at the transition point between the module's guide and the guide of an adjacent module.

Accordingly, it may be desirable to provide guide alignment techniques that allow for float in module installation while maintaining a relatively high level of tolerance in guide transitions.

BRIEF SUMMARY

Among other things, systems and methods are described for maintaining a relatively high level of tolerance in guide transitions in the context of modular installations. Some embodiments operate in the context of a modular data storage environment having a base module and one or more expansion modules. The expansion modules are designed to be easily installed (e.g. without specialized and/or high tolerance tooling), such that the installation may involve a certain amount of chassis float in one or more directions. The data storage environment includes a carriage configured to transport a robotic mechanism along at least one guide to perform operations in both the base module and the one or more expansion modules. Accordingly, the guides in each expansion module are configured to interface with each other in such a way as to provide a transition that allows substantially unhindered movement of the carriage between modules along the guides, while allowing for chassis float in the modular installations.

Some implementations include an expansion guide assembly that is fixed to the expansion module chassis in one location and preloaded with a certain amount of float in another location. As the expansion module is installed, a floating interface feature (e.g., at the preloaded side of the expansion got assembly) interfaces with a substantially fixed interface feature (e.g. at the fixed side of the expansion got assembly) effectively controlling the interface point, while allowing the fixed location of the expansion got assembly effectively to float along with the chassis of the expansion module. As each expansion module is installed, the guide transition with its adjacent module(s) is controlled, thereby mitigating undesirable transition features even in the context of a substantially floating installation.

According to one set of embodiments, an expansion guide alignment system is provided. The expansion guide alignment includes: a first guide configured to guide movement of a carriage in context of a first module of a set of modules and having a floating interface, the floating interface configured to couple with a second guide of a second module at a guide transition location in such a way that movement of the carriage is substantially unimpeded between the second guide and the first guide at the guide transition location when the first module is in a full-install state with reference to the second module; and a preloader coupled with the floating interface, configured to be fixed to a structural feature of a first module, and configured to exert a preloading force in a preloading direction on the floating interface while allowing the floating interface to float in at least one degree of freedom including the preloading direction when the first module is in an uninstalled state.

According to another set of embodiments, a method is provided for aligning guides in expansion modules. The method includes: locating a first module in a partial-install position with reference to an adjacent second module, the first module having a first guide configured to be in a first position with reference to the first module when the first module is not in a full-install position and configured to be in a second position with reference to the first module when the first module is in the full-install position, so that in the partial-install position a first interface of the first guide is in mechanical communication with a second interface of a second guide of the second module, the second interface of the second guide being in a substantially fixed location with reference to the second module; and moving the first module to the full-install position with reference to the second module thereby transitioning the first guide into the second position, so that in the full-install position the first interface interfaces with the second interface in such a way as to manifest a sufficiently stable and contiguous transition between the first guide and the second guide.

According to yet another set of embodiments, a system is provided. The system includes: a structural framework; a first module installed in the structural framework and comprising a first guide assembly configured to guide movement of a carriage in context of the structural framework, the first guide having a first interface in a substantially fixed location relative to the first module; and a second module comprising a second guide assembly and configured to be removably installed in the structural framework by moving the second module from an uninstalled position to an installed position in such a way that the movement causes a second interface of the second guide assembly to automatically register to the first interface thereby manifesting a transition between the first guide assembly and the second guide assembly, the transition being sufficiently stable and contiguous to facilitate substantially unimpeded movement of the carriage between the first module and the second module at the transition when the first module is in the installed position.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIG. 8A shows an illustrative modular framework having a base module and three expansion modules in a partially installed state, according to various embodiments;

FIG. 8B shows another view of the illustrative modular framework in which the second expansion module is in an installed position;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
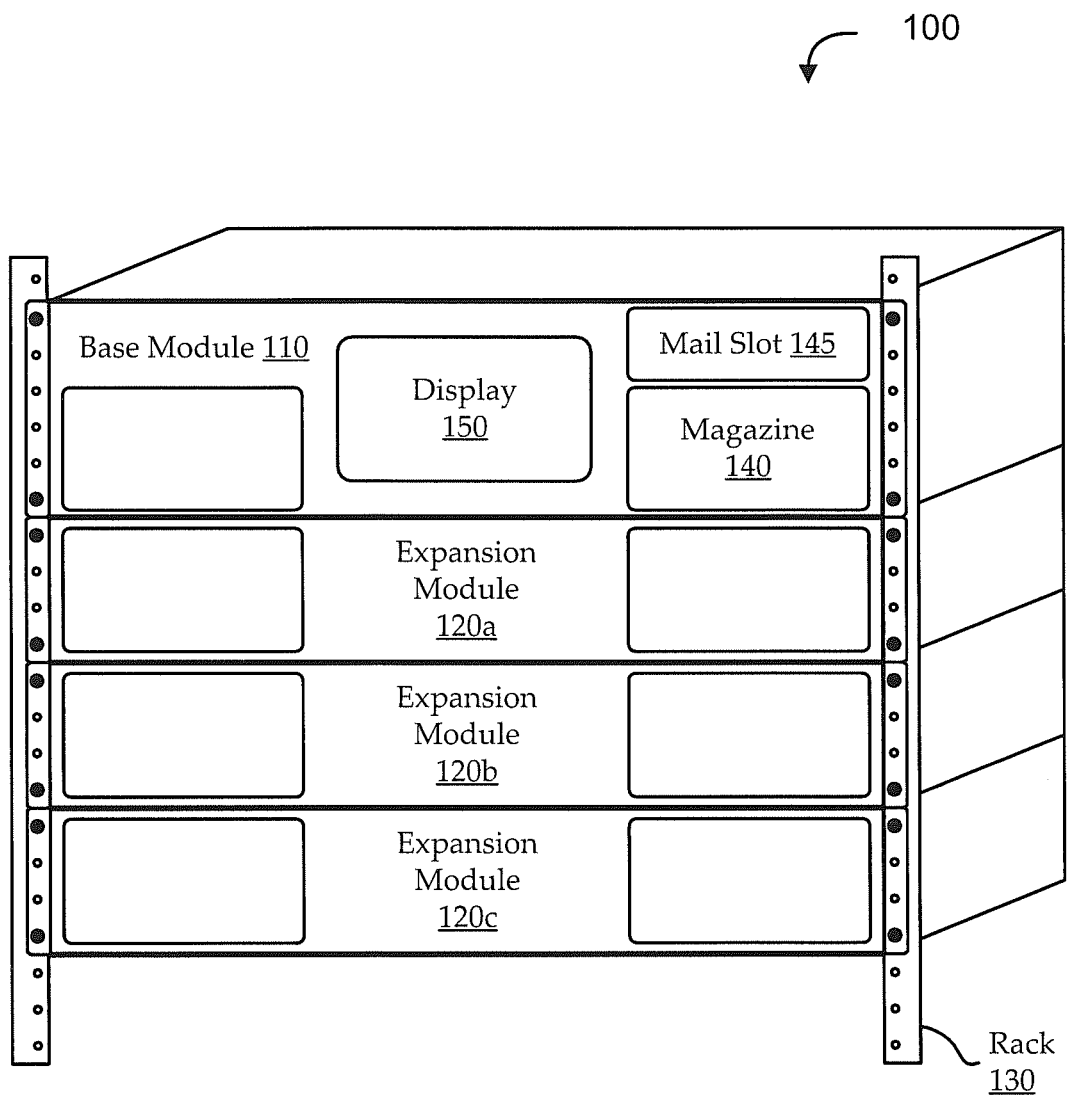
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touchscreen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
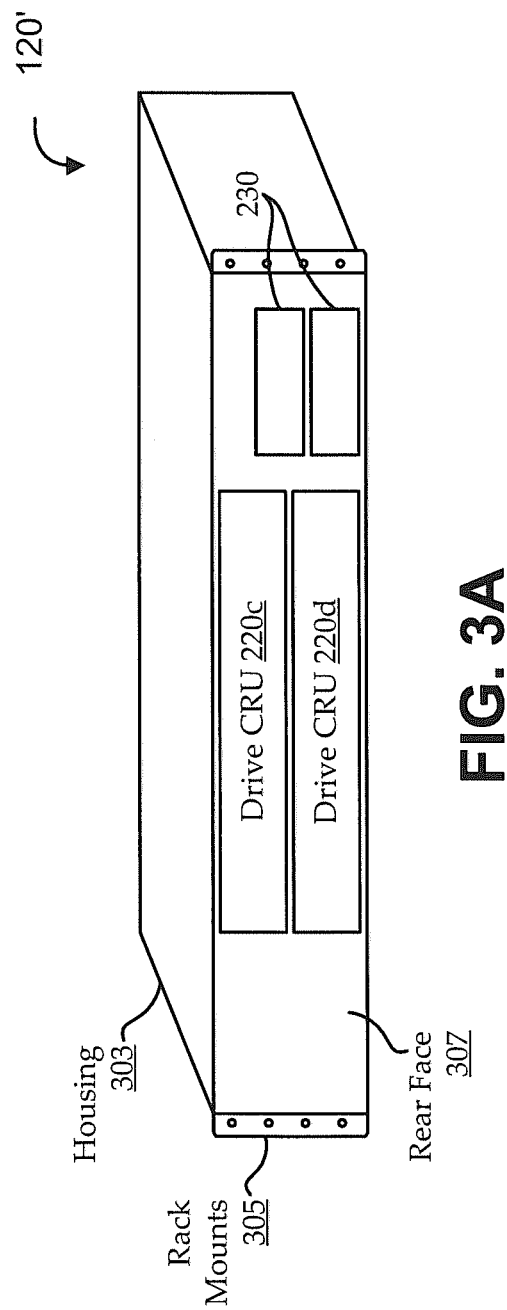
FIGS. 3A and 3B show rear and front views, respectively, of an illustrative expansion module, according to various embodiments.
Figure 3B:
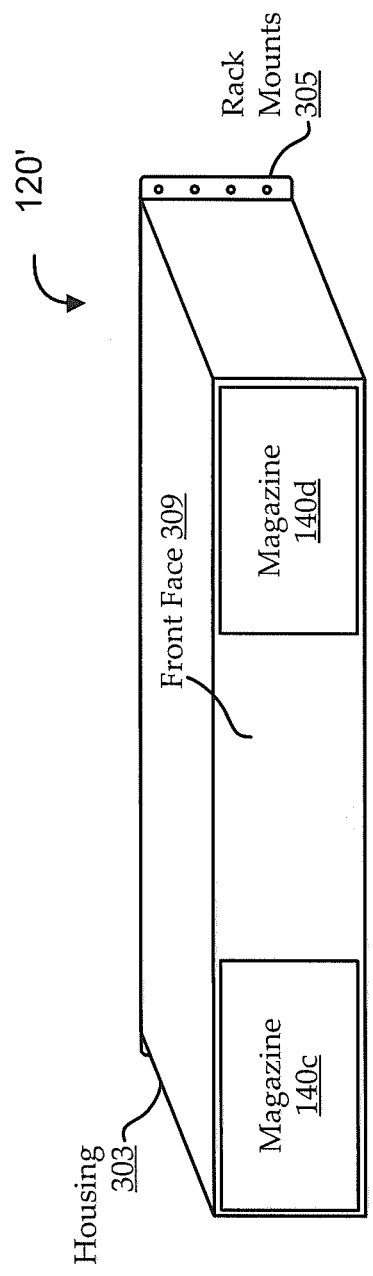

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303

(e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
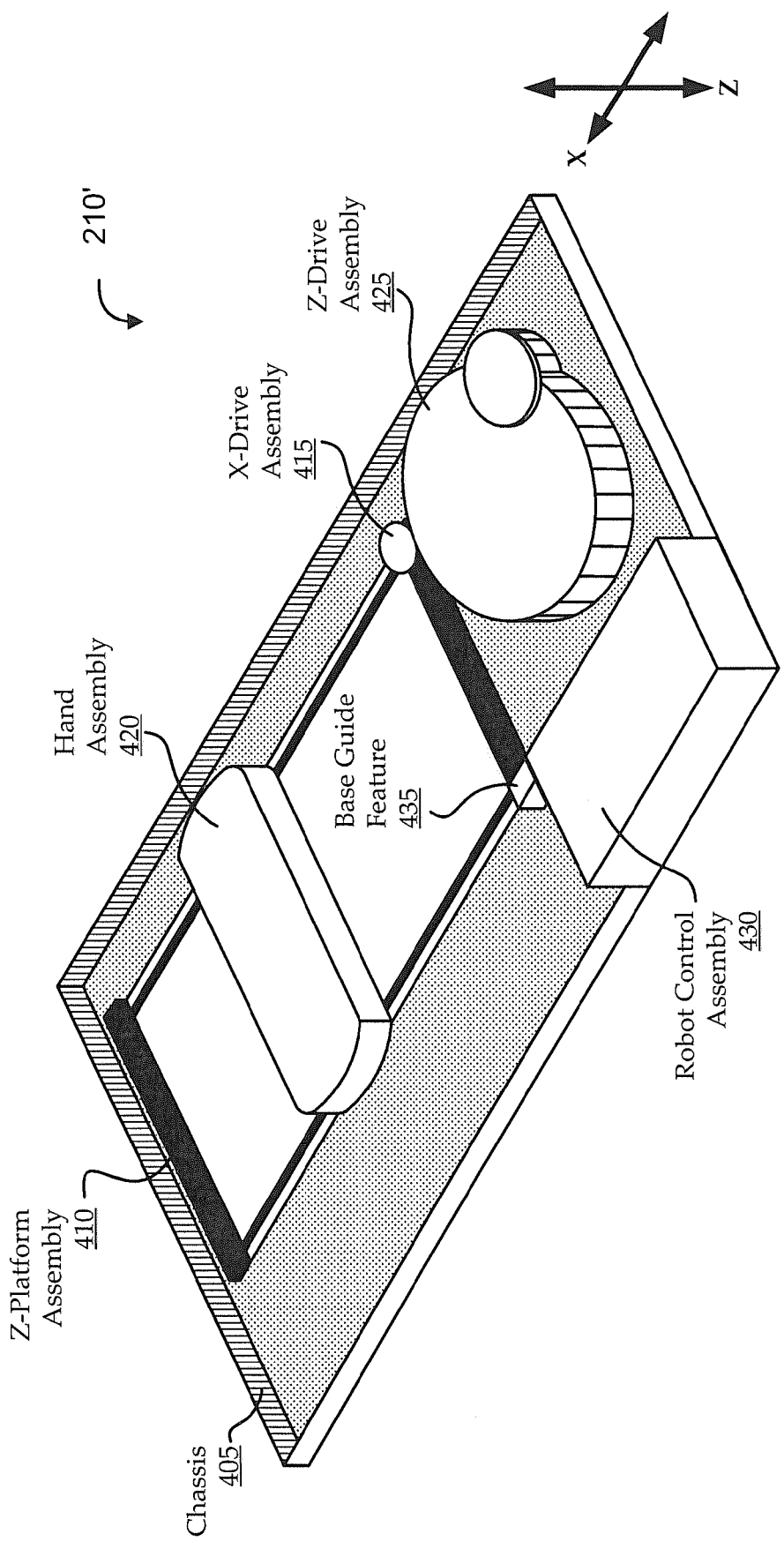
FIG. 4A shows a view looking down on the underside of an illustrative robot CRU (customer replaceable unit), according to various embodiments.
Figure 4B:
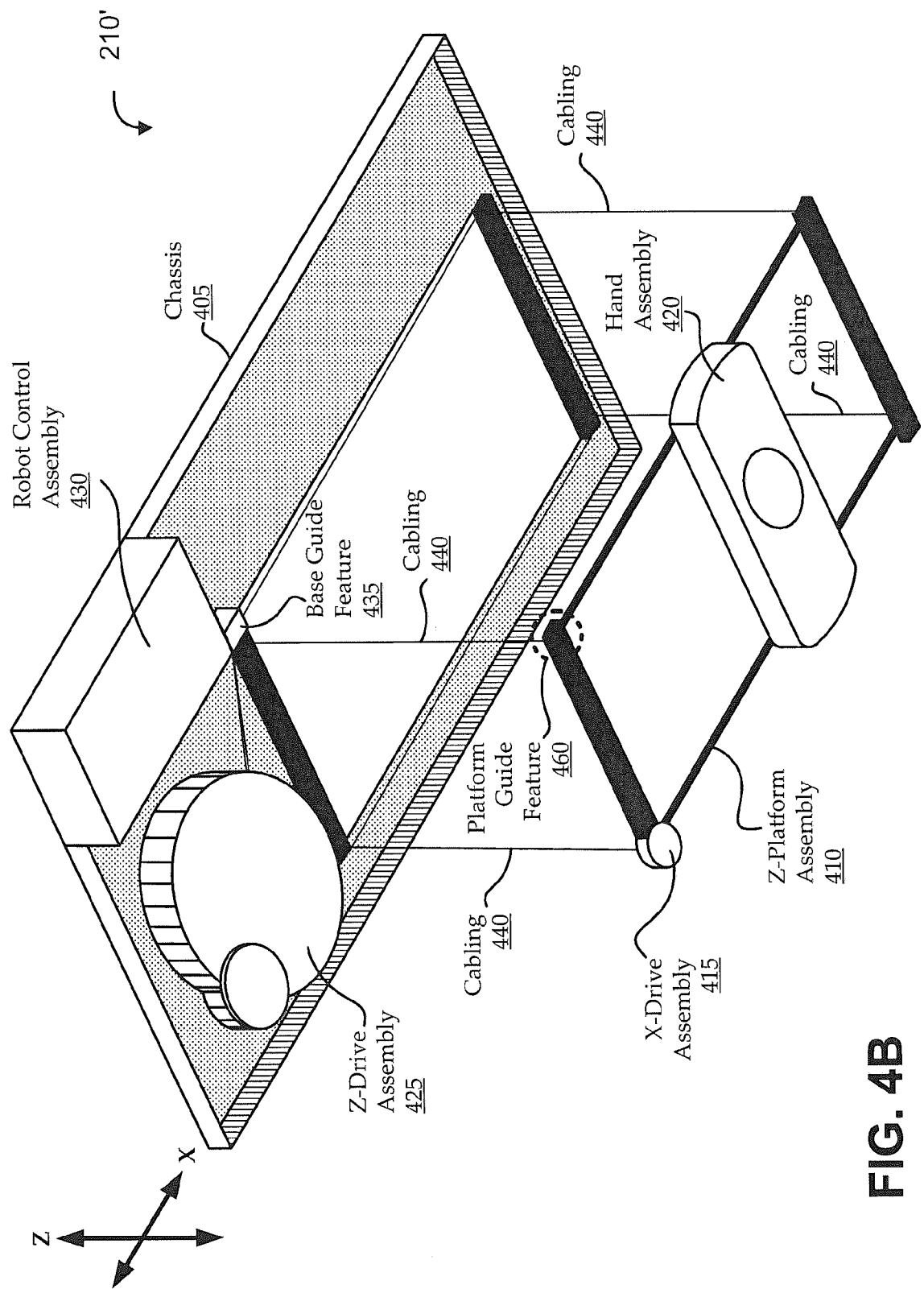
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. In some implementations, one or more guide features are provided. For example, a base guide feature 435 may include a rail, track, and/or any other useful type of guiding feature for guiding motion of the Z-platform assembly 410 in a particular direction (e.g. in the Z-direction). As will be described more fully below, the Z-platform assembly 410 may also include one or more guide features configured to interface with the base guide featured 435.

Embodiments provide other types of motion in other ways. Some embodiments of the hand assembly 420 are coupled to the Z-platform assembly 410 via a "wrist" mechanism that provides motion in a yaw direction (i.e., around the Z-directional axis). Some embodiments of the hand assembly 420 further provide radial movement from the Z-directional axis. For example, a grip mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned using a wrist mechanism to a desired rotational orientation (e.g., to face a cartridge slot or a media drive, to provide a desired angle for use of a sensor, etc.). If desired, a grip mechanism may then be used to reach out (i.e., radially) from that X-Z-position and rotational orientation (e.g., to grab or release a cartridge).

In some implementations, the robot CRU 210' includes a base guide feature 435 that is configured to interface with a platform guide feature 460. Through this interface, motion of the Z-platform assembly 410, for example in the Z-direction, can be guided. Other implementations may have different numbers, types, locations, etc. of guide features. As described herein, embodiments of the base guide feature are configured to interface with guide features of one or more expansion modules to provide a substantially contiguous guide interface. In this way, Z-directional control of the Z-platform assembly 410 (e.g. using the Z-drive assembly 425, the cabling 440, guide features, etc.) can be accomplished across the base module and one or more expansion modules substantially without interference from the guide transitions.

Figure 4C:
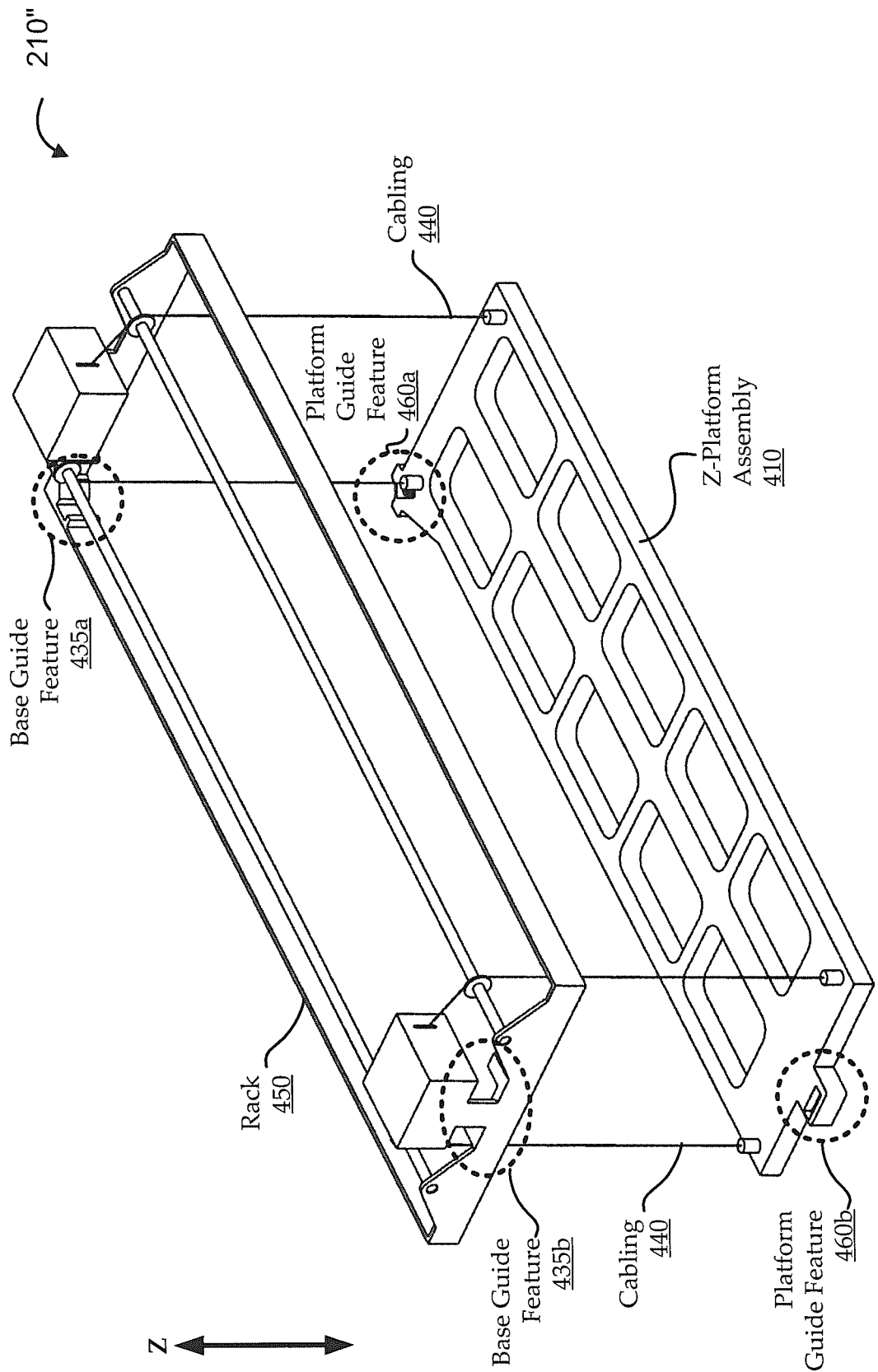
FIG. 4C shows yet another view of an illustrative robot CRU with the Z-platform assembly partially lowered, according to various embodiments.

FIG. 4C shows yet another view of an illustrative robot CRU 210" with the Z-platform assembly 410 partially lowered, according to various embodiments. As illustrated, the Z-platform assembly 410 may not have a solid platform, and may instead be implemented as a carriage having a framework of structural members. For simplicity, the robotic mechanism is not shown. Indeed, the Z-platform assembly of FIG. 4C can be used with the robotic mechanism and/or for other purposes. In the particular embodiment shown, the Z-platform assembly 410 is suspended by cabling 440 from a rack 450. The internal mechanisms to raise and lower the Z-platform assembly 410 on the cabling 440 may be implemented in any useful way.

As shown, to base guide features 435 are integrated into the rack 450. One base guide featured 435*a* is located in one corner of the rack 450, and another base guide feature 435*b* is located on one side of the rack 450 that is substantially opposite the location of the other base guide feature 435*a*. Embodiments of the Z-platform assembly 410 include features configured to interface with the base guide features 435. As illustrated, the Z-platform assembly 410 includes one platform guide feature 460*a* configured to interface with base guide feature 435*a* and another platform guide feature 460*b* configured to interface with base guide feature 435*b*. It is worth noting that different implementations may use different numbers, types, shapes, locations, etc. of guide features. As described below, the base guide features 435 may be configured to interface with guide features of expansion modules in such a way as to provide a substantially contiguous guide for Z-directional movement of the Z-platform assembly 410.

As described above, embodiments are designed to operate in a modular context. For example, as illustrated in FIG. 1, a data storage environment may include a base module 110 and one or more expansion modules 120. In a non-modular implementation of a storage library system, it may be straightforward to minimize any potential discontinuities and/or other undesirable features of a guide. For example, a one-piece guide rail can be installed, multiple pieces can be installed with high levels of tolerance, etc. This can allow a carriage (e.g., Z-platform assembly 410) to move along the entire guide substantially without interference.

In modular implementations, movement of the Z platform assembly 410 throughout the base module 110 and one or more expansion modules 120 may involve extending the guides into those modules. It may be desirable to control the guide transitions between the modules in order to prevent and/or minimize interference from those transitions with Z-directional movement of the Z platform assembly between modules. However, it may be difficult to control these transitions while implementing the expansion modules 120 in such a way as to be easily installed and/or removed (e.g., by an end consumer without specialized and/or high tolerance tooling). For example, designing expansion modules 120 for easy installation may involve designing the expansion modules to have a certain amount of float in one or more directions during installation. This float, however, may not be tolerable at the transition point between the module's guide and the guide of an adjacent module. Embodiments include systems and methods for maintaining a relatively high level of tolerance in guide transitions in the context of modular installations. Guide assemblies in the base module 110 and each expansion module 120 are configured to interface with each other in such a way as to provide a transition that allows substantially unhindered movement of the carriage between modules along the guides, while allowing for chassis float in the modular installations.

Figure 5:
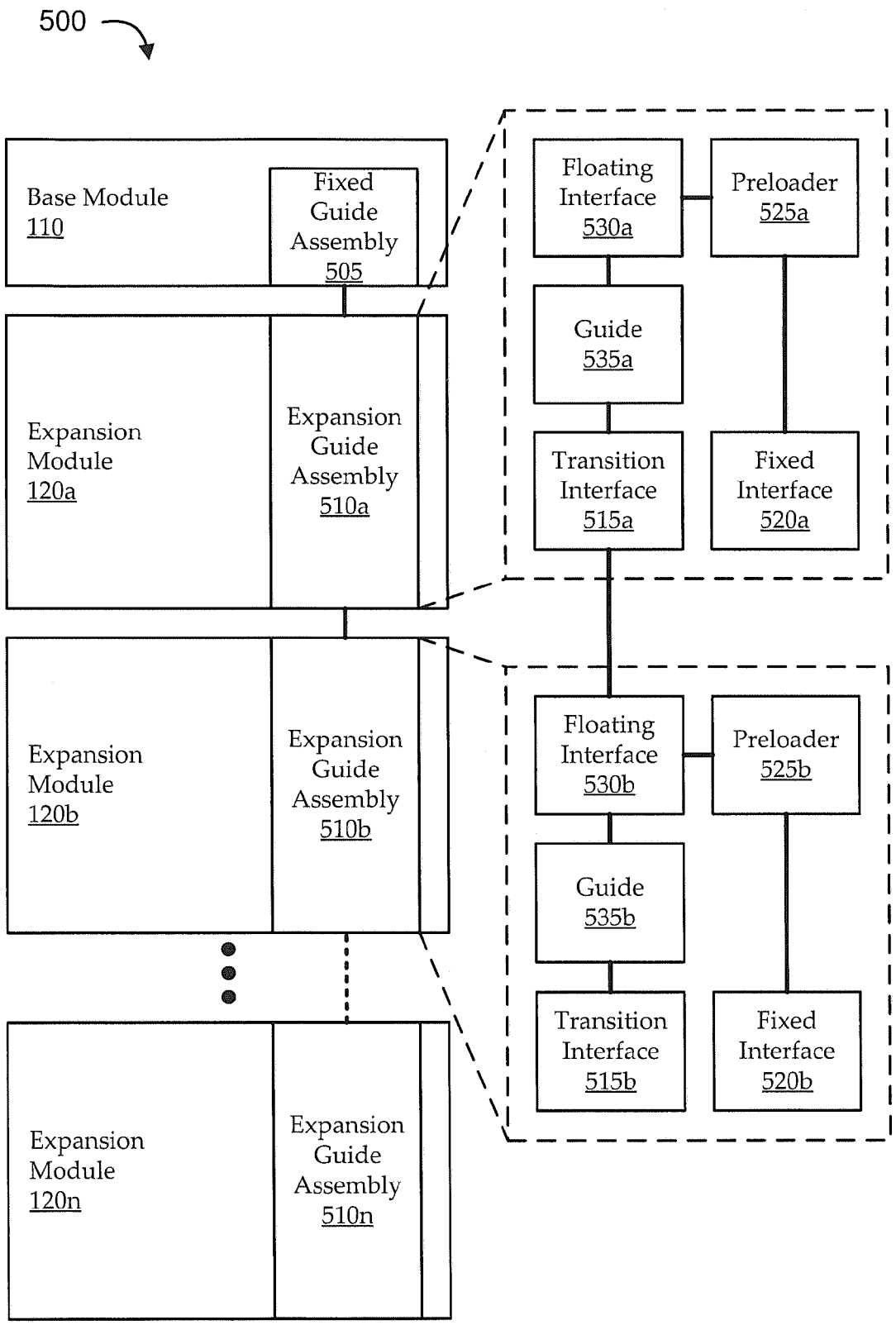
FIG. 5 shows a block diagram of an illustrative modular data storage environment, according to various embodiments.
Figure 6:
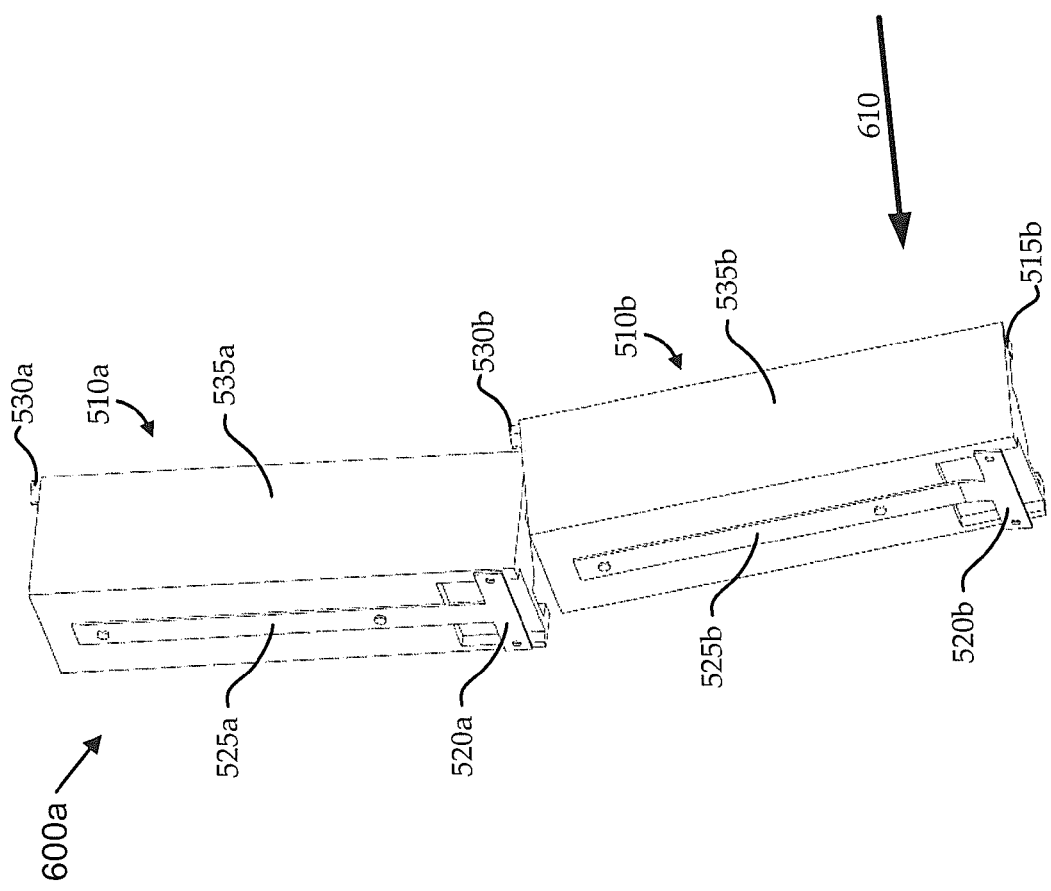
FIGS. 6A and 6B show simplified views of a guide alignment that includes two illustrative expansion guide assemblies, according to various embodiments.

FIG. 5 shows a block diagram of an illustrative modular data storage environment 500, according to various embodiments. The data storage environment 500 includes a base module 110 and multiple expansion modules 120. The base module includes a fixed guide assembly 505, and each expansion module 120 includes an expansion guide assembly 510. Each expansion guide assembly 510 is configured to be partially fixed and partially floating in such a way as to allow the expansion guide assembly 510 of a particular expansion module 120 to interface with guide assemblies of adjacent modules. The expansion guide assemblies 510 are further configured so that interfaces with adjacent modules provides guide transitions of sufficient tolerance to allow for desired movement within those guides, even in the context of a certain amount of chassis float in the installation of the one or more expansion modules 120.

As illustrated, each expansion guide assembly 510 includes a transition interface 515, a fixed interface 520, a preloader 525, a floating interface 530, and a guide 535. The fixed interface 520 is configured to be fixed to a geometric feature of the expansion module 120, for example, to the chassis. In some implementations, the fixed interface 520 is coupled with the chassis of the expansion module 120 in such a way that the fixed interface 520 floats with respect to adjacent modules in substantially the same way that the chassis floats with respect to the same adjacent modules. For example, expansion modules 120 may be installed by being slid into railings of an equipment rack in such a way that the chassis of the expansion module 120 can experience some amount of side-to-side float during installation. The fixed interface 520 of the expansion guide assembly 510 can be coupled to the chassis (e.g. directly or to other structure that is coupled to the chassis) in a manner and location such that side-to-side float of the chassis translates into substantially similar side-to-side float of the fixed interface 520.

The fixed interface 520 may be coupled with the floating interface 530 via the preloader 525. Embodiments of the preloader 525 are configured to exert a preloading force in a particular direction on the floating interface 530. For example, if an expansion module 120 is installed by moving the expansion module primarily in an X direction, the preloading force may be exerted substantially in the same X direction. This may cause the floating interface 530 to be effectively held in a position that is offset in the X direction from the position of the fixed interface 520. The preloader 525 can be implemented in any useful way, for example, using wires, rods, springs, bands, and/or any other material or feature that can exert the preloading force in the desired manner and direction.

In some embodiments, the expansion guide assembly 510 implements the guide 535 in such a way that the floating interface 530 is substantially at one end of the guide 535, and the transition interface 515 is substantially at another end of the guide 535. Implementations of the floating interface 530 are configured to interface with implementations of the transition interface 515 of an adjacent guide assembly (e.g. an adjacent expansion guide assembly 510 or an adjacent fixed guide assembly 505). For example, when expansion module 120a and expansion module 120b are both installed with the base module 110, the floating interface 530a of expansion guide assembly 510a is coupled with the fixed guide assembly 505 of the base module 110, and the floating interface 530b of expansion guide assembly 510b is coupled with the transition interface 515a of expansion guide assembly 510a. The interfaces are designed so that, when the respective modules are fully installed, the various guides 535 will transition to one another in a substantially contiguous fashion (i.e., in such a way as to allow desirable motion within the context of the guides 535).

Providing each expansion guide assembly 510 in such a way as to be partially fixed and partially floating can manifest relatively high tolerance guide transitions even in the context of relatively low tolerance chassis positioning. For example, suppose each expansion module 120 is substantially out of alignment with adjacent expansion modules 120 (e.g., the expansion modules 120 directly above or below). Each expansion guide assembly 510 could then have one end of its guide 535 located with respect to its expansion module 120 and the other end of its guide 535 located with respect to its adjacent expansion module 120. This could result in the guides 535 following a slightly zigzag (i.e., not a straight Z-directional) path. Still, the preloading and interfaces are designed to ensure that each transition between guides 535 remains contiguous enough to allow for substantially unhindered Z-directional movement even along the slightly zigzag path.

It will be appreciated from the description herein that many types of implementations are possible for providing this type of functionality. For example, many types of interface features, preloading features, guide features, and the like can be used to implement functionality described with respect to FIG. 5. FIGS. 6A-9B describe certain implementations of expansion guide assemblies 510. It will be appreciated that the specific implementations, including specific shapes, interfaces, etc., are intended only to be illustrative and should not be construed as limiting the scope of other embodiments.

Turning to FIGS. 6A and 6B, a simplified view is shown of a guide alignment 600 that includes two illustrative expansion guide assemblies 510, according to various embodiments. In FIG. 6A, the two expansion guide assemblies 510 are in a partially installed position with respect one another. Though not all of the components of both expansion guide assemblies 510 can be seen in the view of the guide alignment 600, each expansion guide assembly 510 includes a transition interface 515, a fixed interface 520, a preloader 525, a floating interface 530, and a guide 535. The expansion module 120 chassis and other components are not shown for simplicity. However, it can be assumed that the fixed interface 520 of each expansion guide assembly 510 is coupled in a fixed position with respect to a chassis of their respective expansion module 120.

In some implementations, such as the one illustrated, each expansion guide assembly 510 is manufactured to be substantially identical. Of course, other implementations may include differences between expansion guide assemblies 510, for example, to accommodate for peculiarities of a particular expansion module 120. As illustrated, in each expansion guide assembly 510, the fixed interface 520 is coupled with the preloader 525, and the preloader 525 is coupled with the guide 535. In some implementations, the fixed interface 520 and the preloader 525 are manufactured as a singular component. For example, a T-shaped bar, a rod, or other structural component can be shaped to exert preloading force in one or more directions on the guide 535 while being fixed at its fixed interface 520 with other structure (e.g., the chassis of the expansion module 120).

In the partially installed position, it is assumed that a first expansion guide assembly 510a is fully installed and a second expansion guide assembly 510b is in the process of being installed by being moved primarily in the installation direction illustrated by arrow 610. Being fully installed, components of the first expansion guide assembly 510a are in substantially fixed locations. For example, its fixed interface 515a is fixed with respect to the chassis of its expansion module (e.g., expansion module 120a), which is in a substantially fixed position according to its full installation. Its floating interface 530a is also fixed with respect to the chassis of its adjacent module (e.g., base module 110).

As the second expansion guide assembly 535b moves into place with respect to the first expansion guide assembly 535a, its floating interface 530b encounters the now-substantially-fixed transition interface 515a (not visible) of the first expansion guide assembly 535a. Notably, preloading force exerted by the preloader 525b on the guide 535b causes the floating interface 530b to encounters the transition interface 515a of the first expansion guide assembly 535a before the second expansion guide assembly 535b is in its fully installed position. As the second expansion guide assembly 535b continues to move in the direction of arrow 610, the position of the floating interface 530b becomes substantially fixed with respect to the position of the adjacent transition interface 515a, while allowing the bottom of the guide 535b to float to some extent in context of the connection to its expansion module (e.g., expansion module 120b) via its fixed interface 520b. It is worth noting that the floating interface 530 and the transition interface 515 of each expansion guide assembly 510 is designed (e.g., sized, shaped, oriented, etc.) to substantially fix their relative positions to one another without substantial interfering with portions of the guide that are intended to remain substantially floating.

In some embodiments, the preloading force can be used to facilitate effective expansion guide alignment. As the second expansion guide assembly 535b continues to move in the direction of arrow 610, it may be moving in opposition to the preloading force exerted by the preloader 525 on the guide 535. This preloading force may, thus, effectively hold each floating interface 530 against an adjacent transition interface 515 can maintain a secure, contiguous transition between respective guides 535. Other embodiments can facilitate effective expansion guide alignment in other ways. For example, each floating interface 530 may couple with each adjacent transition interface 515 by interlocking, or the like.

Turning to FIG. 6B, the two expansion guide assemblies 510 are shown in a fully installed state. The first expansion guide assembly 510a is in the same, fully installed position as shown in FIG. 6A; though the second expansion guide assembly 510b has been moved in the direction of arrow 610 to a fully installed position. In the fully installed position, the floating interface 530b of the second expansion guide assembly 510b is now in a substantially fixed location by virtue of its interface with the transition interface 515a of the first expansion guide assembly 510a. The transition interface 515b of the second expansion guide assembly 510b is fixed or floating, depending on the extent to which the chassis of its respective expansion module 120 is fixed or floating. For example, installation of the expansion module 120 may involve screwing the chassis into an equipment rack location at the front of the chassis, while leaving the back of the chassis substantially floating (e.g., depending on the amount of flexibility provided by the chassis materials, configuration, etc.). Alternatively, installation of the expansion module 120 may involve additional securement of the expansion module 120 and one or more ways. Either way, one end of the guide 535 of each module may be substantially secured in a location fixed by its adjacent guide. As such, each guide transition can be formed and maintained even in the context of a substantially floating modular installation.

Figure 7:
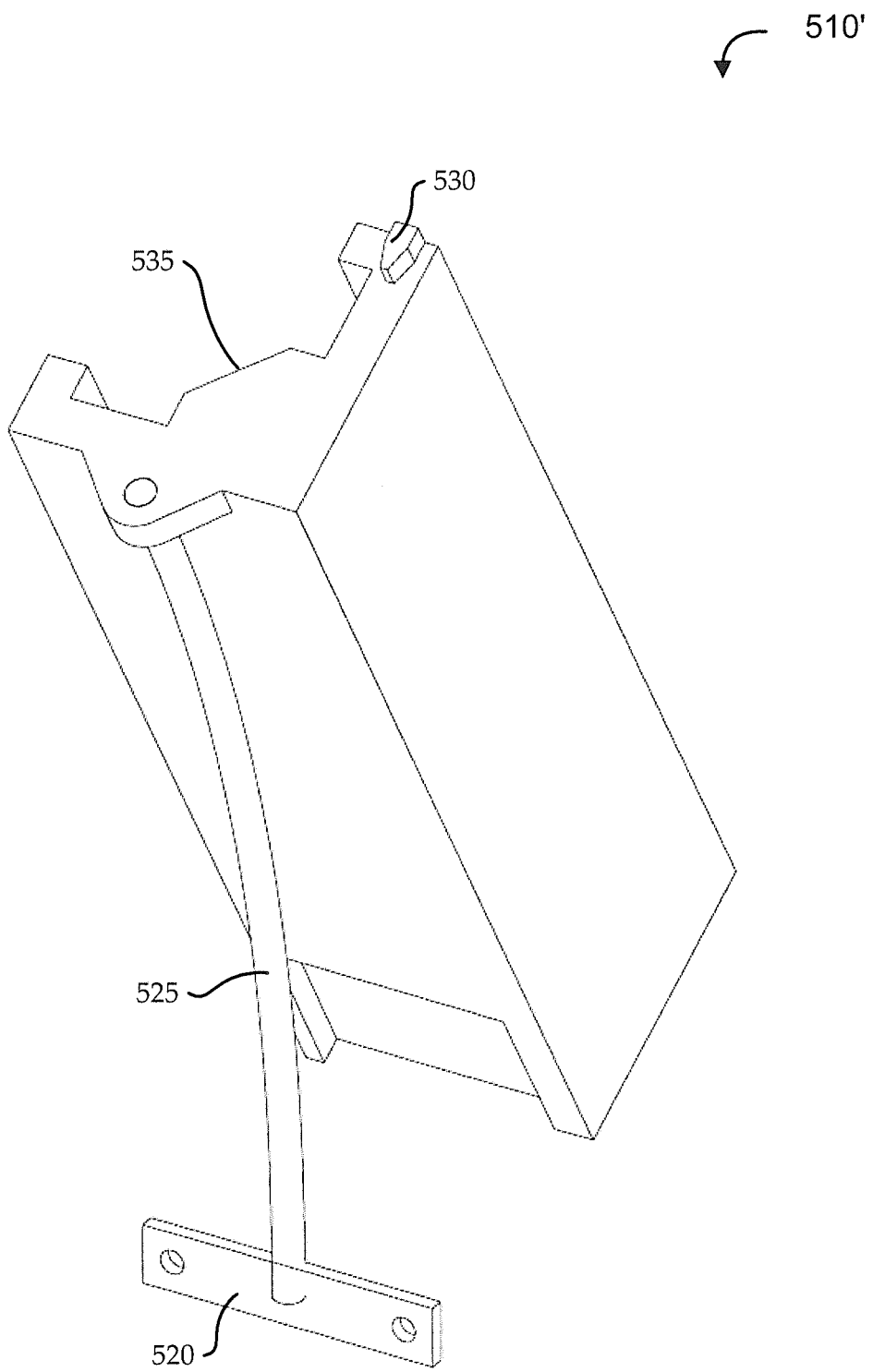
FIG. 7 shows another illustrative expansion guide assembly, according to various embodiments.

FIG. 7 shows another illustrative expansion guide assembly 510', according to various embodiments. The expansion guide assembly 510' includes a fixed interface 520, a preloader 525, a floating interface 530, and a guide 535. As illustrated in FIGS. 6A and 6B, embodiments of the preloader 525 and the fixed interface 520 are designed so that the guide swings primarily in one dimension. For example, a cross-section of the preloader 525 of FIGS. 6A and 6B has a narrow dimension and a wide dimension. The dimensions and the material can be selected so that the preloader 525 is relatively flexible in the direction of the narrow dimension and relatively stiff in the direction of the wide dimension. The preloader 525 of FIG. 7, however, is implemented as a substantially cylindrical shape (e.g., as a rod). In this shape, the preloader 525 may be relatively flexible in multiple dimensions, so that the guide can effectively swing in those multiple dimensions.

Configuring the preloader 525 to be relatively flexible in one or more dimensions and/or directions may be useful for different implementations of modularity. For example, if the installation of expansion modules 120 tends to result in slight misalignment of those modules in one primary direction (e.g., in the X direction), it may be sufficient for the preloader 525 to be relatively flexible in only that one primary direction. If, on the other hand, installation of expansion modules 120 tends to result in slight misalignment of those modules in multiple directions (e.g., front-to-back and left-to-right), it may be desirable to design the preloader 525 for relative flexibility in those multiple directions. As used herein, those multiple directions of relative flexibility may be referred to as "degrees of freedom." For example, designing the preloader 525 to have relative flexibility in multiple directions (e.g. or designing an interface between the preloader 525 and the guide 535 to have relative flexibility in multiple directions) may effectively allow one or more portions of the guide to have multiple degrees of freedom.

For the sake of adding clarity, FIGS. 8A and 8B illustrate installation of various expansion modules using expansion guide alignment techniques in substantially one degree of freedom. Turning first to FIG. 8A, an illustrative modular framework 800a is shown having a base module 110 and three expansion modules 120 in a partially installed state, according to various embodiments. The base module 110 is shown to be implemented in substantially the same way as illustrative robot CRU 210" described above with reference to FIG. 4C. The equipment rack, the Z platform assembly 410, the robotic mechanism, and other systems and/or components that may be present within the structural framework 800 are not shown to avoid obscuring certain features. As illustrated, a first expansion module 120a is in a fully installed position, and a second expansion module 120b and a third expansion module 120c are shown in partially installed positions.

In the fully installed position, the expansion guide assembly 510a of the first expansion module 120a is fully installed in a location that is referenced against the fixed guide assembly 505 of the base module 110. For example, side of the guide 535a that is designed to float when not installed is substantially secured in its installed position via interfaces between its features and features of the fixed guide assembly 505. Accordingly, a guide portion of the fixed guide assembly is coupled with the guide 535a of the first expansion guide assembly 510a in such a way as to form a substantially contiguous guide (e.g., for Z-directional movement of the Z-platform assembly 410, or the like).

In the partially installed position, the second expansion module 120b in the third expansion module 120c are in their preloaded states. As described above, preloading forces acting on the respective guides 535 may cause floating portions of the guides 535 to be offset (e.g., to point) in a direction determined by the preloading force. In the illustrative structural framework 800, installation direction and the direction of the preloading force are both substantially the direction indicated by arrow 810. As such, the preloading force may cause floating portions of the expansion guide assemblies 510 to come into contact with interface features of adjacent expansion guide assemblies 510 before their respective expansion modules 120 are fully installed.

Turning to FIG. 8B, another view of the illustrative modular framework 800b is shown in which the second expansion module 120b is in an installed position. One or more supplemental alignment features 820 may be used to limit the degrees of freedom in which the expansion modules 120 can float during installation. For example, the one or more supplemental alignment features 820 may substantially limits motion of some or all of each expansion module 120 in directions orthogonal to the primary installation direction indicated by arrow 810.

As the second expansion module 120b is moved from its partially installed to its fully installed position, the floating features of its expansion guide assembly 510b effectively become secured (i.e., such that they are no longer floating) via interfaces between its features and features of its adjacent, installed expansion guide assembly 510a. As described above, in some implementations, the preloading force causes the floating features of the expansion guide assembly 510 to become substantially fixed in a desirable guide transition location, and to continue to be held in that desirable location by the preloading forces, once the expansion module 120 has been moved into a partially installed position. Continued movement of the expansion module 120 from the partially installed position into the fully installed position may involve moving the expansion module 120 in opposition to the preloading force. This may effectively allow the previously floating portions of the expansion guide assembly 510 to remain in the desired guide transition location while the expansion module 120 continues to be moved into its fully installed position.

Notably, if the second expansion module 120b is moved into a position that is slightly out of alignment with the first expansion module 120a (e.g., it is not pushed in far enough or it is pushed in slightly to far), the portion of the expansion guide assembly 510b that is fixed with respect to the chassis of the expansion module 120b may not be precisely below the once-floating portion of the expansion guide assembly 510b. As such, the guide may not be completely straight (e.g., the guide may not follow a high-tolerance, Z-directional line). However, the interfaces between the expansion guide assemblies 510 can still maintain sufficiently contiguous transitions between the modules to allow for substantially unimpeded Z-directional travel using the guides.

Figure 9:
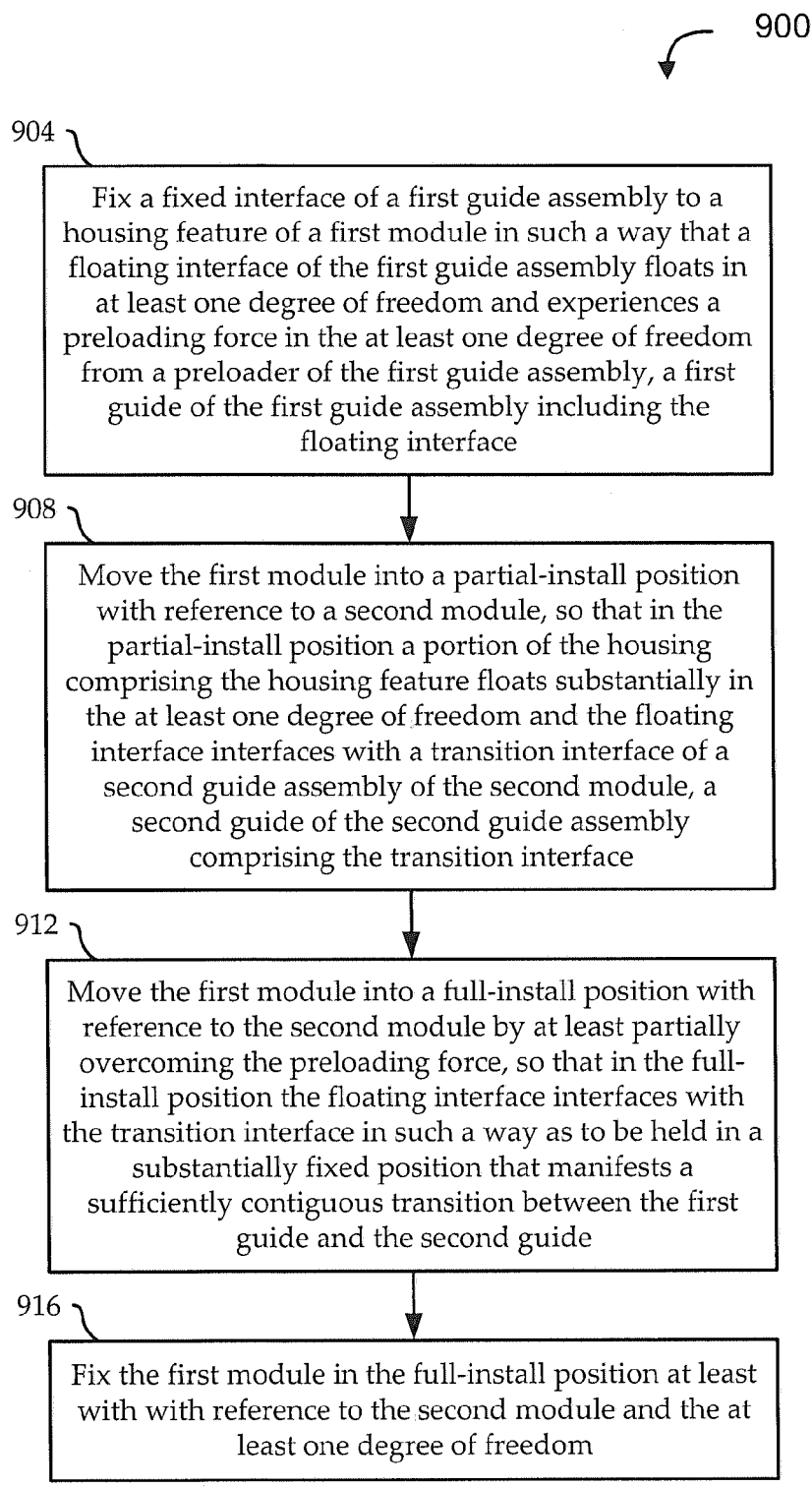
FIG. 9 shows a flow diagram of an illustrative method for providing expansion guide alignment functionality, according to various embodiments.

FIG. 9 shows a flow diagram of an illustrative method 900 for providing expansion guide alignment functionality, according to various embodiments. The method 900 begins at stage 904 by fixing a fixed interface of a first guide assembly to a housing feature of a first module. The fixed interface is coupled with the first module in such a way that a floating interface of the first guide assembly can float in at least one degree of freedom while experiencing a preloading force in the at least one degree of freedom from a preloader of the first guide assembly. A first guide of the first guide assembly includes the floating interface.

For example, the first guide assembly includes the first guide. One end of the first guide includes the floating interface, and the preloader is coupled with the first guide in a location that is near the floating interface. The preloader is also coupled with (e.g., or integrated with) the fixed interface, which is fixed to the housing of the first module. In this way, the floating interface of first guide effectively floats in one or more directions and experiences a preloading force in one or more directions.

At stage 908, the first module is moved into a partial-install position with reference to a second module. For example, the first module may be installed in an equipment rack location that is directly above or below that of the second module. In the partial-install position, a portion of the housing of the first module comprising the housing feature floats substantially in the at least one degree of freedom. For example, the housing feature may be located near the rear of the module housing, and installation of the module may be performed in a way that allows the rear of the module housing to float in or out, side to side, etc. In the partial-install position, the floating interface of the first guide assembly interfaces with a transition interface of a second guide assembly of the second module. The second guide assembly includes a second guide that includes the transition interface.

At stage 912, the first module is moved from the partial-install position to a full-install position with reference to the second module. In the full-install position, the floating interface of the first guide assembly interfaces with the transition interface of the second guide assembly in such a way as to be held in a substantially fixed position that manifests a sufficiently contiguous transition between the first guide and the second guide. The transition may be considered sufficiently contiguous when motion along the guide can be accomplished without substantial interference from the transition.

As described above, movement of the first module from the partial-install position to the full-install position may involve partially overcoming the preloading force. For example, once the floating interface of the first guide assembly is in mechanical communication with the transition interface of the second guide assembly, further motion of the first module is in opposition to the preloading force pushing the floating interface against the transition interface. This can help secure the contiguous guide transition, both during installation and during system operation.

In some embodiments, at stage 916, the first module is fixed in the full-install position at least with reference to the second module and the at least one degree of freedom. It will be appreciated that the "full-install" position may, in fact, be a range of positions over the one or more degrees of freedom due, for example, to tolerances in the installed components, tolerances in the installation environment (e.g., the equipment rack, installation hardware, etc.), installer behavior (e.g., the user pushing the module too far in, not far enough in, at a slight angle, etc.), etc. The floating interfaces, preloading, and/or other portions of the guide assemblies are designed to account for the range of full-install positions. Of course, some environments may have relatively small ranges of full-install positions, while other environments may be appreciably more tolerant.

For the sake of clarity, an illustrative expansion module (e.g., the "first module") can be installed in a rack-mounted data storage system (such as the one illustrated in FIG. 1) as follows. An available equipment rack slot is identified for the installation as the slot directly below the bottom-most, already-installed expansion module (e.g., the "second module"). The first module is slid into the equipment rack on rails, so that it has very little side-to-side motion as it is slid into place. For the sake of simplicity, this can be considered a case in which there is only one degree of freedom (i.e., the module can slide in or out, but not up, down, left, or right by any appreciable amount). It is assumed for the sake of this example that the first module's preloader is preloading the floating portion of its guide assembly substantially in the install direction (i.e., substantially toward the read of the equipment rack). After pushing the first module into the slot by a certain amount, the first module reaches the "partial-install" location at which its floating interface comes into mechanical communication with the second module's transition interface (i.e., as a result of the preloading), for example, as described with reference to stage 908.

The first module can be pushed the rest of the way into the equipment rack slot, substantially in opposition to the preloading force, for example, as described with reference to stage 912. Over some range of positions (e.g., determined by the floating interface configuration, the preloading configuration, etc.) the top of the first module's guide can be effectively secured into place in the guide transition location by interface features and the preloading force, even if the bottom of the guide remains substantially unsecured (i.e., because the first module can still be pushed further in, slid out, etc.). The first module can then be fixed into some full-install position within the range of acceptable positions using any useful fixing techniques (e.g., using mounting hardware, latches, friction, etc.), for example, as described with reference to stage 916. Fixing the module in this way may limit the module's ability to move in the "degree of freedom" direction (i.e., the install or uninstall direction, further into or out of the equipment rack). This may be useful in further stabilizing the guides and/or other components within the first module. Fixing the module may also effectively fix the transition interface of the first module guide assembly for use in installing another module adjacent thereto.

It will be appreciated that some embodiments described above are configured only to allow the modules to be installed in a particular order. The floating interface of one module may interface with the transition interface of another module in such a way that it is effectively interlocked (e.g, restricting or preventing decoupling by movement in one or more directions). Each module may be designed, for example, to be installed only in the next adjacent slot of an equipment rack and to be uninstalled only in the reverse of the order in which they were installed. Alternative embodiments may be designed to allow for installation and/or removal in other orders. For example, the interfaces may interlock in such a way that can be decoupled by moving the module in a certain direction. In another example, the interfaces are designed to have a release latch that allows the modules to be removed "out of order." In still another example, the module is designed to allow a user to manually decouple the guides from each other prior to removal of a module. Other implementations are possible according to other embodiments.

It will be further appreciated that some embodiments can provide the same or similar functionality using various biasing techniques (e.g., with or without preloader). For example, each module's guide can be coupled to its respective module in such a way that it is biased into a first position when the module is not installed and is moved (e.g., forced, guided, interlocked, etc.) into a second position when the module is installed. Biasing the guidance of the first position near may not involve pushing or holding the guide in the first position using a preloader.

Figure 10:
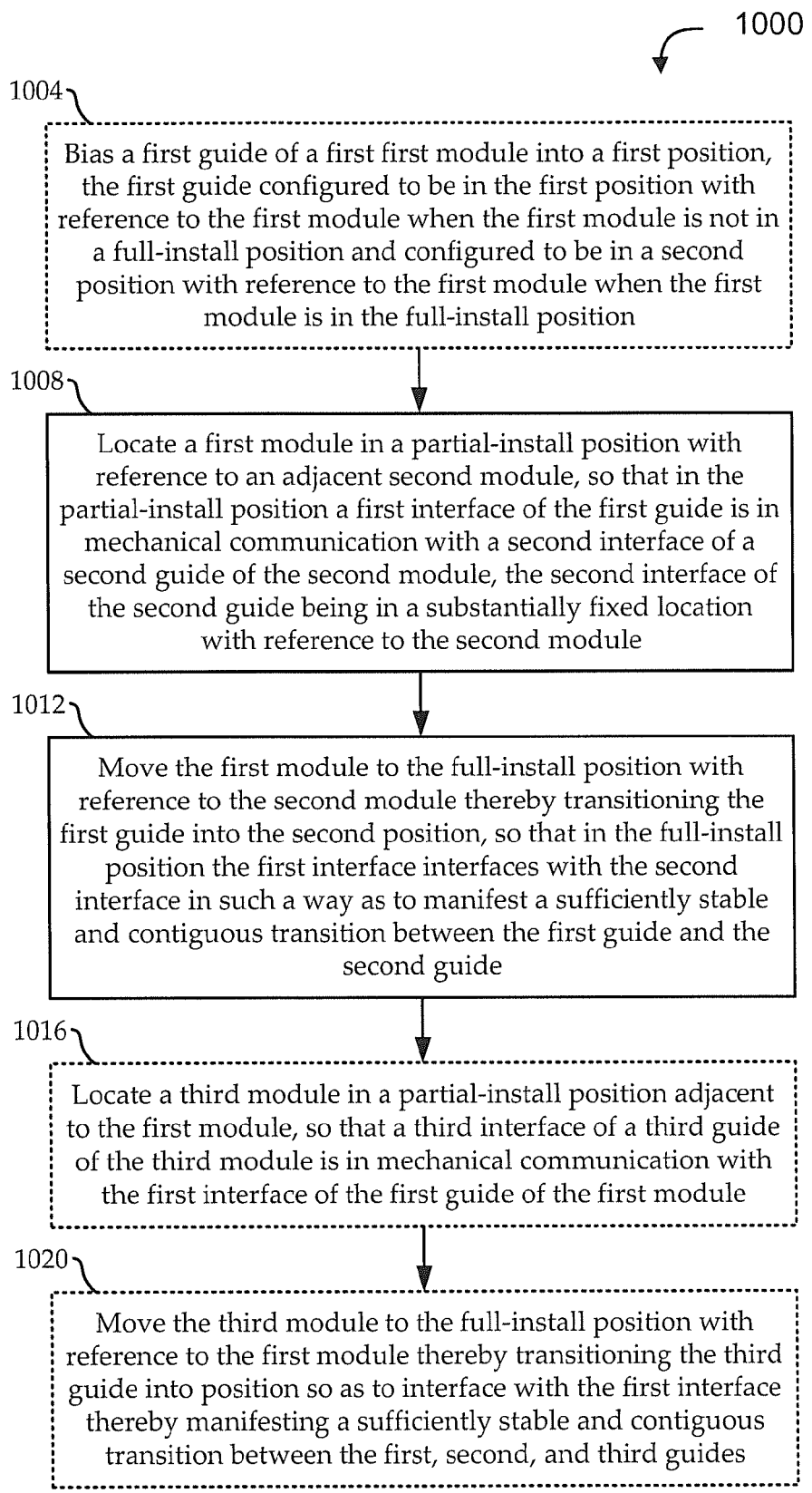
FIG. 10 shows a flow diagram of another illustrative method for providing expansion guide alignment functionality, according to various embodiments.

FIG. 10 shows a flow diagram of another illustrative method 1000 for providing expansion guide alignment functionality, according to various embodiments. The method 1000 begins at stage 1004 by biasing a first guide of a first module into a first position. As discussed above, the first guide can be configured to be in the first position with reference to the first module when the first module is not in a full-install position and configured to be in a second position with reference to the first module one the first module is in the full-install position. In one implementation, the first guide is biased into the first position under the force of gravity. For example, the coupling between the first guide and the first module is designed so that the first module has a tendency to position and/or orient itself (e.g. by tilting, sliding, rotating, etc.) normally into the first position. In different implementations, the guide may be shaped, weighted, attached, or otherwise configured to effectively bias itself into the first position under the force of gravity. Alternatively, certain embodiments are configured to force the first guide into the first position using the preloading force. For example, by coupling a preloaded or to a floating interface of the guide (e.g., as illustrated in FIGS. 6A-8B), the guide can effectively be pushed into the first (preloaded) position.

At stage 1008, the first module is located in a partial-install position with reference to an adjacent second module. In this partial-install position, a first interface of the first guide is in mechanical communication with a second interface of a second guide the second module. The second interface of the second guide is assumed to be in a substantially fixed location with reference to the second module. For example, a second module may be a base module having a substantially fixed guide assembly coupled thereto. In another example, the second module may be an expansion module that has been fully installed in a structural framework, so that the interfaces of its guide are now substantially stabilized (e.g. under various installation forces, securements, etc.).

At stage 1012, the first module is moved from the partial-install position to the full-install position with reference to the second module, thereby transitioning the first guide from the first position to the second position. With the first guide in its second position, the first interface interfaces with the second interface in such a way as to manifest a sufficiently stable and contiguous transition between the first guide in the second guide. For example, moving the first module into the full-install position may cause the first interface to interlock with the second interface, or to otherwise register and secure itself relative to the second interface.

It will be appreciated that there are many ways to implement the first and second positions of the guide, and the transitions between those positions. In one illustrative implementation, the first position is a first orientation in which at least a portion of the guide is tilted in such a way as to facilitate mechanical communication and registration with the second guide beginning at the partial-install position. Moving the guide to the full-install position may then cause the guide to tilt (or un-tilt) into a second orientation for full registration and coupling. In another illustrative implementation, the first position locates features of the guide relative to the first module in such a way that those features come into contact with features of the second guide of the second module at the partial-install position. Moving the guide to the full-install position may then cause the guide to move (slide, rotate, etc.) to a second location relative to the first module. Notably, moving the guide to the second location may, in fact, involve holding the guide in the same position so that at least some features of the guide stay in substantially the same position relative to the second module while the first module moves (i.e., such that the guide effectively moves relative to the first module). In yet another illustrative implementation, interface features of the guide are coupled with one or more elastic features, and biasing the guide in the first position involves tilting the interface features of the guide (under the force of gravity) to register with one or more features of the second module's guide in the partial-installation position. As the module is moved into its full-install position, the interface features of its guide remain in substantially the same location while the elastic features of the guide are placed in tension.

In any of the above or other embodiments, various techniques can be used to maintain a secure interface between the guides. In some implementations, interface features are configured to interlock with each other. In other implementations, preloading force, elastic forces, and/or other forces introduced before or during the installation of the modules is used to hold interface features together. In still other implementations, interface features are secured or further secured using additional securing techniques. For example, fixing a module into its full-install position may further secure the guide transition features, installing additional transition components may further secure the guide transition features, etc.

Additional modules can be similarly installed, for example, to expand modular functionality while maintaining guide alignment. For example, some embodiments may continue with stages 1016 and 1020. At stage 1016, the third module is located in the partial-install position adjacent to the first module. As described with reference to stage 1008, in the partial-install position, the third interface of a third guide of the third module is in mechanical communication with (e.g., contacting) the first interface of the first guide of the first module. At stage 1020, the third module is moved into the full-install position with reference to the first module thereby transitioning the third guide into its interface position. As described with reference to stage 1012, in the full-install position, the third interface of the third guide interfaces with a fourth interface of the first guide to manifest a sufficiently stable and contiguous transition between the first, second, and third guides.

For example, the modules of method 1000 can be modules of a data storage system, such as the one described with reference to FIG. 1. The data storage system can be configured so that expansion modules can be added in succession, each in the next adjacent location of an equipment rack. As each expansion module is added, it is first located in a partial-install position in which features of its guide begin to register with features of the guide of its adjacent module. When expansion module is moved into its final, full-install position, registration of the guide features may become complete and secure, thereby creating a secure and contiguous guide transition. The modular guides, with their secure and contiguous transitions, can be used to facilitate movement of the carriage (e.g., a Z platform assembly carrying a robotic mechanism) within and between the various modules.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. An expansion guide alignment system comprising:
   a first guide configured to conduct movement of a carriage in context of a first module of a set of modules and having a floating interface, the floating interface configured to couple with a second guide of a second module at a guide transition location in such a way that movement of the carriage is substantially unimpeded between the second guide and the first guide at the guide transition location when the first module is in a full-install state with reference to the second module; and
   a preloader coupled with the floating interface, configured to be fixed to a structural feature of a first module, and configured to exert a preloading force in a preloading direction on the floating interface while allowing the floating interface to float in at least one degree of freedom including the preloading direction when the first module is in an uninstalled state.

2. The expansion guide alignment system of claim 1, wherein:
   the preloader is further configured to exert the preloading force in such a way that substantially holds the floating interface coupled with the second guide of the second module at the guide transition location when the first module is in the full-install state.

3. The expansion guide alignment system of claim 1, wherein:
   the second guide includes a transition interface that is maintained substantially at the guide transition location; and the floating interface of the first guide is configured to couple with the second guide at the transition interface of the second guide.

4. The expansion guide alignment system of claim 1, wherein the first guide includes a transition interface that is maintained substantially at a second guide transition location when the first module is in the full-install state.

5. The expansion guide alignment system of claim 4, wherein the transition interface of the first guide is held substantially at the second guide transition location at least in part by the preloading force acting on the coupling between the floating interface of the first guide and the second guide of the second module.

6. The expansion guide alignment system of claim 1, wherein the preloader comprises a structural member configured to be substantially flexible in the least one degree of freedom and substantially inflexible in directions other than the least one degree of freedom.

7. The expansion guide alignment system of claim 1, wherein the first module is configured to be moved into the full-install state in a primary installation direction, at least a component of the preloading direction points substantially in the primary installation direction, and the structural member is configured to be substantially flexible in at least the primary installation direction.

8. A method for aligning guides in expansion modules, the method comprising:
locating a first module in a partial-install position with reference to an adjacent second module, the first module having a first guide configured to be in a first position with reference to the first module when the first module is not in a full-install position and configured to be in a second position with reference to the first module when the first module is in the full-install position, so that in the partial-install position a first interface of the first guide is in mechanical communication with a second interface of a second guide of the second module, the second interface of the second guide being in a substantially fixed location with reference to the second module;
moving the first module to the full-install position with reference to the second module thereby transitioning the first guide into the second position, so that in the full-install position the first interface interfaces with the second interface in such a way as to manifest a sufficiently stable and contiguous transition between the first guide and the second guide.

9. The method of claim 8, further comprising:
biasing the first guide into the first position prior to the locating step.

10. The method of claim 9, wherein the first guide is biased into the first position by coupling a preloader to the first guide in such a way as to exert a preloading force on at least a portion of the first guide causing the guide to be preloaded into the first position.

11. The method of claim 10, wherein the preloader is configured to exert the preloading force on at least a portion of the first guide in such a way as to hold the first interface against the second interface thereby substantially securing the contiguous transition between the first guide and the second guide.

12. The method of claim 8, wherein moving the first module to the full-install position causes the first interface to interlock with the second interface in such a way as to manifest the sufficiently stable and contiguous transition between the first guide and the second guide.

13. The method of claim 8, further comprising:
fixing the first module in the full-install position at least with reference to the second module in such a way as to substantially secure the contiguous transition between the first guide and the second guide.

14. The method of claim 8, wherein the first position is a first orientation and the second position is a second orientation.

15. The method of claim 8, further comprising:
locating a third module in a partial-install position adjacent to the first module, the third module having a third guide configured to be in a third position with reference to the third module when the third module is not in a full-install position and configured to be in a fourth position with reference to the third module when the third module is in the full-install position, so that in the partial-install position a third interface of the third guide is in mechanical communication with the first interface of the first guide of the first module;
moving the third module to the full-install position with reference to the first module thereby transitioning the third guide into the fourth position, so that in the full-install position the third interface interfaces with the first interface thereby manifesting a sufficiently stable and contiguous transition between the first, second, and third guides.

16. A system comprising:
a structural framework;
a first module installed in the structural framework and comprising a first guide assembly configured to guide movement of a carriage in context of the structural framework, the first guide having a first interface in a substantially fixed location relative to the first module;
a second module comprising a second guide assembly and configured to be removably installed in the structural framework by moving the second module from an uninstalled position to an installed position in such a way that the movement causes a second interface of the second guide assembly to automatically register to the first interface thereby manifesting a transition between the first guide assembly and the second guide assembly, the transition being sufficiently stable and contiguous to facilitate substantially unimpeded movement of the carriage between the first module and the second module at the transition when the first module is in the installed position.

17. The system of claim 16, wherein the second guide assembly comprises a guide configured to be in a first position when the second module is in the uninstalled position and to be in a second position when the second module is in the installed position.

18. The system of claim 17, wherein the second guide assembly further comprises a preloader configured to exert a preloading force on the guide to preload the guide into the first position.

19. The system of claim 18, wherein the preloader is further configured to exert the preloading force on the guide in such a way as to hold the second interface in mechanical communication with the first interface thereby securing the transition.

20. The system of claim 16, wherein:
the structural framework comprises a rack for supporting the first and second modules, the first and second modules being modules of a storage system configured to hold a plurality of storage targets to be picked and placed by a robotic mechanism; and the carriage is configured to transport the robotic mechanism throughout at least a portion of the storage system at least along the first and second guide assemblies.

* * * * *

UNITED STATES PATENT AND TRADEMARK OFFICE
CERTIFICATE OF CORRECTION

PATENT NO. : 8,724,332 B2  Page 1 of 1
APPLICATION NO. : 13/408883
DATED : May 13, 2014
INVENTOR(S) : Manes et al.

It is certified that error appears in the above-identified patent and that said Letters Patent is hereby corrected as shown below:

In the Drawings

On sheet 12 of 13, in figure 9, under reference numeral 916, line 2, before "reference" delete "with".

On sheet 13 of 13, in figure 10, under reference numeral 1004, line 1, before "module" delete "first".

In the Specification

In column 5, line 48, delete "and or" and insert -- and/or --, therefor.

In column 6, line 41, delete "and or" and insert -- and/or --, therefor.

Signed and Sealed this
Fourteenth Day of October, 2014

Michelle K. Lee
*Deputy Director of the United States Patent and Trademark Office*